Jan. 28, 1964  D. E. WILCOX ET AL  3,119,607
FLEXURAL SUSPENSION BEARING
Filed Aug. 21, 1961  3 Sheets-Sheet 1

INVENTOR.
DOYLE E. WILCOX
THAD VREELAND, JR.
BY
Edward A. Sokolski
ATTORNEY

United States Patent Office 3,119,607
Patented Jan. 28, 1964

3,119,607
FLEXURAL SUSPENSION BEARING
Doyle E. Wilcox, La Puente, and Thad Vreeland, Jr., Arcadia, Calif., assignors to North American Aviation, Inc.
Filed Aug. 21, 1961, Ser. No. 132,922
3 Claims. (Cl. 267—1)

This invention relates to a flexural suspension bearing and more particularly to such a bearing having a high ratio of bending to torsional spring rate.

Flexural suspension members are often utilized in precision force or torque sensing devices such as inertial instruments. Such flexural suspensions may be used to rigidly support a proof body along three translational axes, with high torsional stiffness about two axes and low or negligible stiffness about the third axis.

A flexural suspension for pendulously supporting a gyrocompass is shown in copending application Serial No. 105,577 filed April 26, 1961, inventor Doyle E. Wilcox, entitled Pendulous Gyrocompass which is assigned to North American Aviation, Inc., the assignee of this application. In the device described in application No. 105,577, the flexure bearing utilized provides a minimal torsional spring rate about the longitudinal axis of the flexure while maintaining high bending stiffness about the transverse axes. This allows for pendulous suspension of the gyroscope with freedom about an input axis and substantially constrained about the output and spin axes.

In the devices of the prior art, designs have been utilized which employ flexure bearings having cross sections whose thickness is small compared to their length in order to minimize the torsional spring rate. The minimum thickness that can be used is limited by the necessity of preventing buckling of the thin element about the transverse axes when bending stresses are encountered. The critical buckling stress is essentially proportional to the square of the element thickness for straight elements of uniform thickness such as those which are generally used.

A good configuration for a flexure bearing is an elongated V-shaped member having thin flat leg portions. The flexure bearing is generally fabricated of a spring like material such as spring steel. In such a V-shaped flexure bearing, to assure adequate resistance to buckling of the thin element when bending stresses are encountered, a minimum thickness for the flexure must be established. However, this minimum thickness places a limit on the minimum torsional spring rate about the longitudinal axis of the flexure which can be achieved with a given material and dimension for the flexure. Therefore any design must necessarily be a compromise between the buckling stress requirement and the requirement for a minimal torsional spring rate.

The device of this invention provides means for considerably increasing the resistance of an elongated V-shaped flexure to buckling without raising the torsional spring rate. This end result is achieved by bending the ends of the legs of the V-shaped flexure bearing outwardly away from the center line of the vertex of the V. In this manner a considerably higher ratio of torsional to bending spring rate is achieved. It is therefore an object of this invention to provide an improved flexural suspension bearing.

It is a further object of this invention to provide a flexure bearing having a lower ratio of torsional to bending spring rate than prior art devices.

It is still a further object of this invention to provide a flexure bearing having considerable resistance to buckling along transverse bearing axes combined with negligible torsional stiffness about the longitudinal axis.

It is still a further object of this invention to provide an improved elongated V-shaped flexure bearing for use in pendulously suspending a mass.

Other objects of this invention will become apparent from the following description taken in connection with the accompanying drawings of which:

Figure 2:
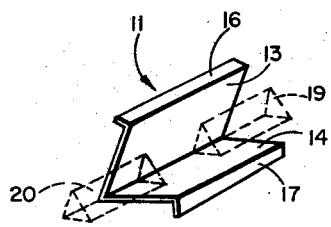
FIG. 2 is a perspective view illustrating a preferred embodiment of the device of the invention.
Figure 4:
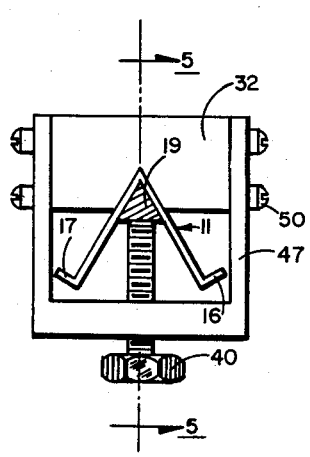
FIG. 4 is an end view of the device of the invention as used to suspend a mass from a support.
Figure 5:
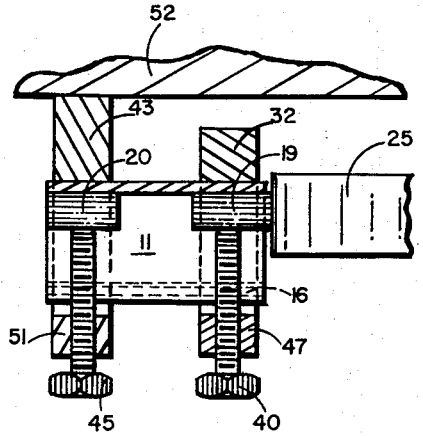
FIG. 5 is a cross-sectional view taken along a plane as indicated by the line 5—5 in FIG. 4.

Referring now to FIG. 2, a perspective view of the preferred embodiment of the device of the invention is illustrated. The flexure bearing 11 which may also be referred to as a "flexure" comprises a pair of thin flat sides 13 and 14 forming the legs of an elongated V. The free ends 16 and 17 respectively of leg portions 13 and 14 are bent outwardly away from the center of the vertex of the V formed by the leg portions at an angle of substantially 90°. A pair of wedge shaped bars 19 and 20 (shown in outline) are fixedly attached to the V-shaped member at opposite ends of the vertex portion thereof. The other end of bar 19 may be attached to a mass to be supported, while bar 20 may be attached to a support member as shown in FIGS. 4 and 5. Flexure bearing 11 should be fabricated of a suitable high alloy steel. Flexures fabricated of Elgiloy available from the Elgin Watch Company have been found to operate satisfactorily.

Referring now to FIGS. 4 and 5, views of the device of the invention as used to pendulously support a mass from a support member are illustrated. Wedge shaped bar 20 is attached to one end of the vertex portion of flexure bearing 11 while wedge shaped member 19 is attached to the other end of the vertex portion of the flexure member. Wedge shaped bar 19 and the vertex portion of one end of support member 11 are clamped to block 32, which has a wedged shaped indentation to receive the vertex portion of the V, by means of clamping screw 40. Screw 40 is threadably engaged in bracket 47 and bracket 47 is fixedly attached to block 32 by means of screw 50. By tightening screw 40 into clamping engagement with bar 19, the bar and flexure 11 are securely held together. The other end of wedge shaped bar 19 is fixedly attached to the mass to be supported 25.

Wedge shaped bar 20 is similarly held to the other end of the vertex portion of flexure bearing 11 by means of bracket 51, and screw 45 operating in conjunction with block 43. Block 43 is fixedly attached to the support 52 from which the mass is to be suspended.

It is to be noted that the suspension technique illustrated in FIGS. 4 and 5 is shown for exemplary purposes only and that the flexure bearing may be utilized in any other fashion that application requirements may dictate.

Figure 1:
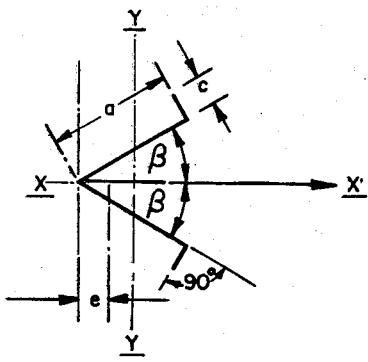
FIG. 1 is a schematic diagram illustrating the basic features of the device of the invention.
Figure 3:
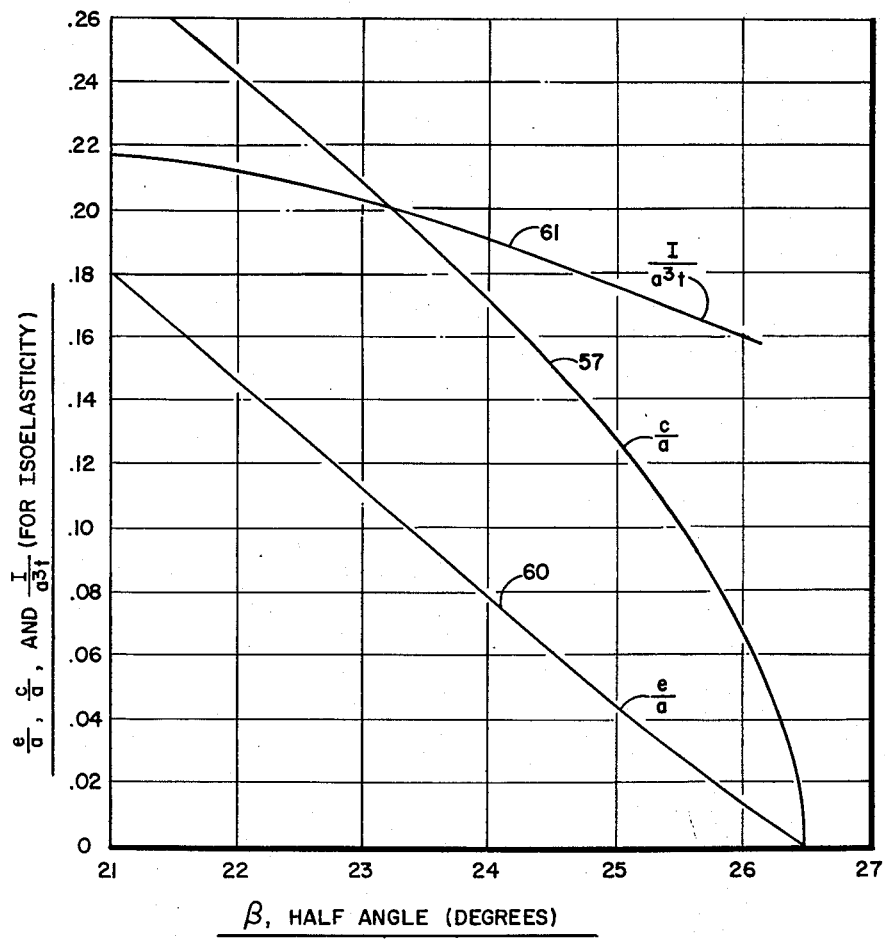
FIG. 3 is a graph illustrating the design of the device of the invention for isoelasticity.
Figure 6:
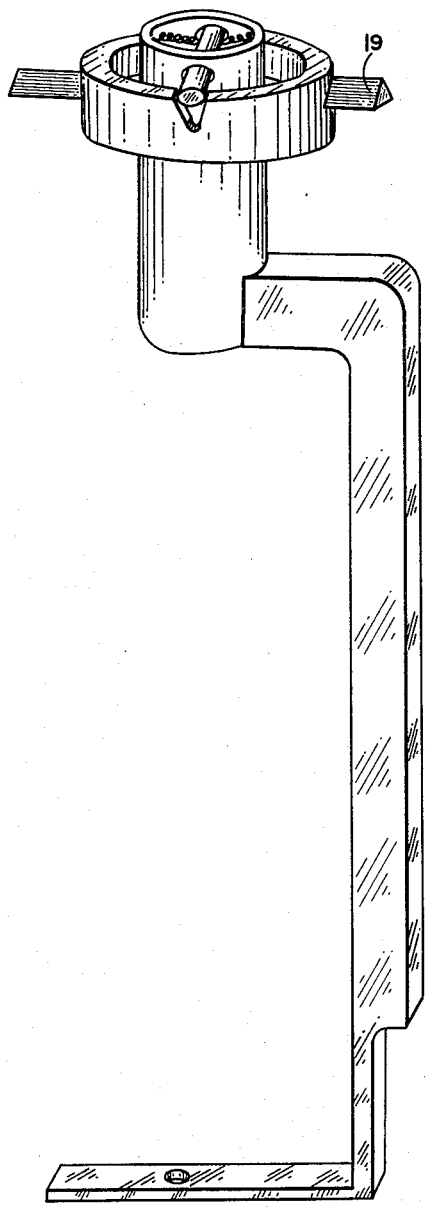
FIG. 6 shows a pendulum adapted to be supported by a flexural suspension bearing of this invention.

It is highly desirable in a flexure bearing of the type illustrated to utilize an isoelastic design in which the bending stiffness is equal about the transverse axes. Referring now to FIGS. 1 and 3, FIG. 3 is a graph illustrating the dimensional relationships required in the device of the invention for isoelasticity about the transverse axes while FIG. 1 illustrates the various parameters involved. Graph line 57 shows the ratio necessary for an isoelastic design between the dimension "$c$" which is the width of the bent over end portions 16 and 17 and "$a$" which is the legnth of leg portions 13 and 14 up to the bend, for various values of $\beta$, where $\beta$ is defined as the angle formed between each of leg portions 13 and 14 and the centerline of the vertex of the V indicated in FIG. 1 by the line $x$—$x$.

The isoelastic condition is realized when $(I_{xx})=(I_{yy})$ where $(I_{xx})$ is the moment of inertia about the centroidal axis $x$—$x$ indicated in FIG. 1 and $(I_{yy})$ is the moment of inertia about the centroidal axis $y$—$y$ as indicated in FIG. 1. It can be shown that for the isoelastic condition that $$\frac{3(I_{xx})}{2ta^3}=\sin^2\beta(1-\tan\beta)+\cos^2\beta\left(\tan\beta+\frac{c}{a}\right)^3 \quad (1)$$

where the various parameters are as indicated in FIG. 1 with "$t$" being the thickness of the leg portions of the V. It similarly can be shown that $$\frac{3(I_{yy})}{2ta^3}=\cos^2\beta(1-\cot\beta)-\sin^2\beta\left(\cot\beta-\frac{c}{a}\right)^3$$
$$-\frac{3}{4}\frac{\sin^2\beta}{1+\frac{c}{a}}\left[\cot\beta+\left(2\cot\beta-\frac{c}{a}\right)\frac{c}{a}\right]^2$$

$$(2)$$

Utilizing the information in Equations 1 and 2, the graph line 57 as shown in FIG. 3 with $$\frac{c}{a} \text{ vs. } \beta$$

for isoelasticity can be plotted.

The center of twist ratio $$\frac{e}{a} \text{ vs. } \beta$$

for isoelasticity, where $e$ as indicated in FIG. 1 is the distance along the $x$ axis from the vertex of the V to the center of twist is indicated in FIG. 3 by graph line 60. The moment of inertia ratio, $$\frac{I}{a^3 t} \text{ vs. } \beta$$

for isoelasticity is indicated by graph line 61 in FIG. 3. The equation used in plotting graph lines 60 and 61 is as follows:

$$\frac{e}{a}=\frac{\cos\beta}{\frac{I}{a^3t}}\left[\left(\tan\beta+\frac{c}{a}\right)^2\frac{c}{a}-\frac{\left(\tan\beta+\frac{c}{a}\right)^3}{3}+\frac{\tan^3\beta}{3}\right]$$

$$(3)$$

Graph lines 57, 60, and 61 in FIG. 3 indicate the various dimensional relationships for an isoelastic design.

The device of this invention thus provides a simple yet highly effective means for increasing the buckling resistance of a flexure pivot without sacrificing the desired low torsional spring rate. An isoelastic design with a considerably high ratio of torsional to bending spring rate is thereby made possible.

While the device of this invention has been described and illustrated in detail it is to be clearly understood that this is intended by way of illustration and example only and not by way of limitation, the spirit and scope of this invention being limited only by the terms of the following claims.

We claim:

1. A flexural suspension bearing for pendulously suspending a mass from a support comprising a V-shaped member, said V-shaped member having a pair of thin flat leg portions, the ends of said leg portions being bent outwardly from the broad surfaces of said leg portions, and a pair of wedge shaped bars fixedly attached to said V-shaped member at opposite ends of the vertex portion thereof, one of said bars being attached to said mass, the other of said bars being attached to said support.

2. A flexural suspension bearing for pendulously suspending a mass from a support comprising a V-shaped member fabricated of spring metal, said V-shaped member having a pair of thin flat leg portions, the ends of said leg portions being bent outwardly at an angle of substantially 90° relative to the broad surfaces of said leg portions, and a pair of wedge shaped bars fixedly attached to said V-shaped member at opposite ends of the vertex portion thereof, one of said bars being attached to said mass, the other of said bars being attached to said support.

3. In combination, a mass, a support, flexural bearing means for pendulously suspending said mass from said support comprising a spring metal V-shaped flexure having thin flat leg portions, the ends of said leg portions being bent outwardly from the vertex of the V, and a pair of wedge shaped bars, each of said bars being attached to an opposite end of said flexure in mating relationship with the vertex thereof, one of said bars being attached to said mass, the other of said bars being attached to said support.

References Cited in the file of this patent

UNITED STATES PATENTS

| | | |
|---|---|---|
| 2,004,907 | Wallen et al. | June 11, 1935 |
| 2,069,911 | Bourdon | Feb. 9, 1937 |
| 2,797,580 | Taylor | July 2, 1957 |
| 2,906,522 | Wagner | Sept. 29, 1959 |